Jan. 3, 1950　　　　　　A. H. WEINMAN　　　　　　2,493,175
WATER HEATER
Filed July 5, 1946

INVENTOR.
ALFRED H. WEINMAN
BY
Gerald P. Welch
ATTORNEY

Patented Jan. 3, 1950

2,493,175

UNITED STATES PATENT OFFICE 2,493,175

WATER HEATER

Alfred H. Weinman, Highland Park, Ill.

Application July 5, 1946, Serial No. 681,463

1 Claim. (Cl. 219—39)

The present invention refers to improvements in electric heaters for fluids, and particularly that type which may be known variously as automatic electric water heaters, automatic electric storage water heaters, overnight off-peak electric water heaters, controlled electric water heaters and the like.

While the invention refers particularly to apparatus which may be so described, the scope and application are not limited thereto.

Electric water heating has attained appreciable importance as a residential service. While there may be differences in practices and policies, there are characteristics which are general, as granting of low rates for electric power used for residential water heating at predetermined times, overnight for example, when demand for power at higher rates for other uses may be small. The use of heaters at such special low rates for electric power so consumed is usually at the option of, and controlled by the electric power supply company. Apparatus acceptable for such use is usually specified and controlled similarly.

Representative of acceptable apparatus might be a storage tank of relatively large capacity, thermally insulated, and having suitable piping connection with the cold water supply mains and the hot water delivery line in the user's premises. An electric heating element of capacity usually proportional to the capacity of the storage tank may be inserted in the tank, near the base, thus being immersed in the water contained in the storage tank, or inserted in a "well" which is so immersed.

The base element may be connected with the electric power supply through a control device, a clock-operated switch for example, in order that use or operation of the base element may be limited to predetermined time or times specified by the electric power supply company.

A second electric heating element may be immersed in the tank, located for example at a point approximately one quarter of the height of the storage tank below the top thereof.

Electrical connections between the heating elements and the power supply may be arranged variously. Both heating elements might be operated at the special low rate for power at predetermined times, the upper element being operated at a higher rate at all other times; either of the two elements, but not both, might be operated at the low rate at predetermined times, and the upper element at a higher rate at all other times; the base element might be operated at predetermined times only and at the special low rate, while the upper element might be operated at the higher at all times.

Thermostatic controls are usually provided in reference to each of the two elements, to disconnect the power supply from the heating element when the water in contact with the thermostatic device attains a predetermined temperature.

The present invention has for one of its objects the isolation of the heating from the storage functions of the water heater.

Another object of the invention is to permit the quick delivery of hot water to the top of the tank where it can be used without mixture with the cooler contents of the tank.

Other and further objects of the invention will appear as the description proceeds, reference being had to the accompanying drawing, in which.

Figure 1:
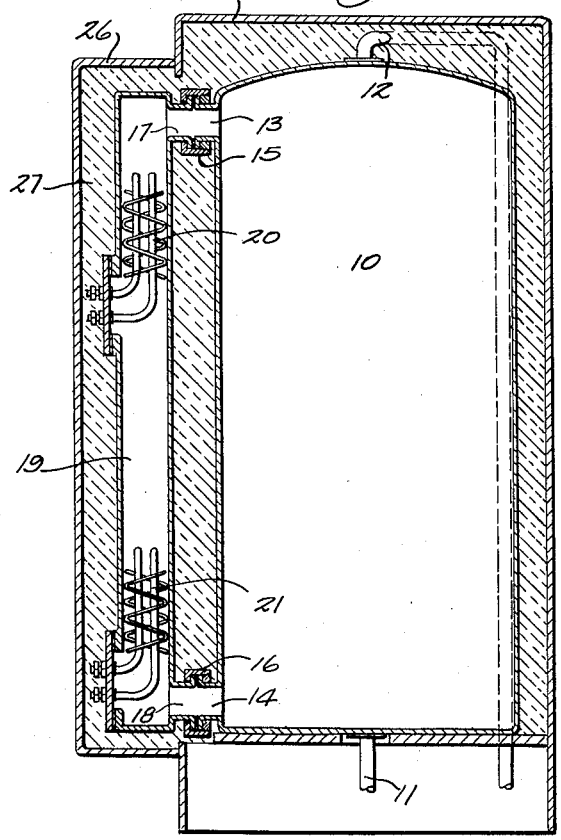
Fig. 1 is a vertical sectional view of an electrical water heater embodying my invention.
Figure 2:
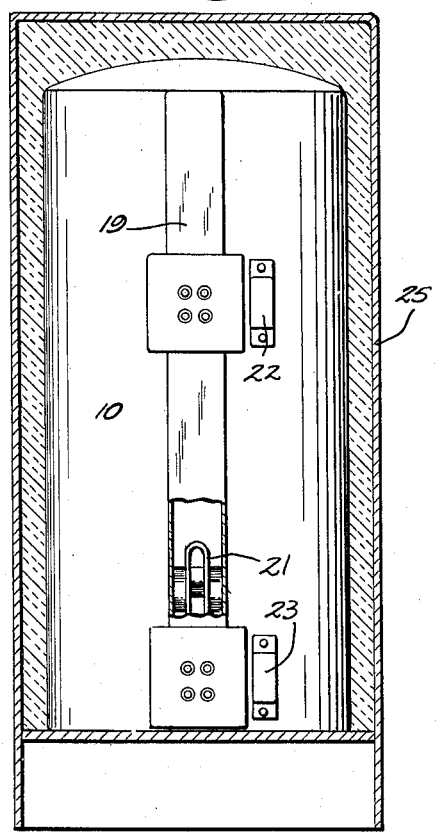
Fig. 2 is a view in elevation thereof.
Figure 3:
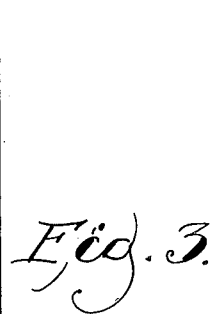
Fig. 3 is a view in horizontal section thereof.

Referring more particularly to the drawings, the numeral 10 refers to a vertical cylindrical water tank, having the cold water intake pipe 11 and the top hot water discharge pipe 12. A pair of pipe projections 13 and 14 extend laterally from the top and bottom respectively of the tank 10, engaging with and secured by couplings 15 and 16 to the lateral pipe projections 17 and 18 of the vertical isolation tube 19. A pair of immersion electrical heaters 20 and 21 are contained in said tube 19 and have the related thermostatic controls 22 and 23.

In use, the column of water in tube 19 is heated by one or both heaters 20 and 21 and passes upwardly into the top portion of the tank 10, making a desired volume of water immediately available for use by withdrawal through the said discharge pipe 12.

An outer cabinet 25 houses the tank 10 and contains an insulation agent, and the tube 19 is covered by a cabinet 26 also containing the insulation means 27.

It will be understood that the device is capable of ample modification in structure and design, without departing from the spirit of the invention, within the scope of the appended claim.

Having thus described my invention, I claim:

An electric water heater comprising a vertical cylindrical tank, a separate vertical tube adjacent thereto of the same longitudinal dimension as said tank, an immersion water heater in the upper part of said tube, a second immersion water heater in the lower part of said tube, water flow connections between the upper part of the tube and the upper part of the tank and between the lower part of the tube and the lower part of the tank, and thermostatic controls one for each of said immersion water heaters.

ALFRED H. WEINMAN.

REFERENCES CITED

The following references are of record in the file of this patent:

UNITED STATES PATENTS

| Number | Name | Date |
| --- | --- | --- |
| 1,438,621 | Thornton et al. | Dec. 12, 1922 |
| 1,467,381 | Hulbert | Sept. 11, 1923 |
| 1,731,058 | Pierson | Oct. 8, 1929 |
| 2,039,030 | Reifenberg | Apr. 28, 1936 |
| 2,157,910 | McCormick | May 9, 1939 |
| 2,251,411 | Metzgar | Aug. 5, 1941 |